United States Patent
Bender et al.

(10) Patent No.: US 11,946,521 B2
(45) Date of Patent: Apr. 2, 2024

(54) STOP ASSEMBLY FOR DAMPER MASSES OF A DAMPER SYSTEM

(71) Applicant: ZF Friedrichshafen AG, Friedrichshafen (DE)

(72) Inventors: Jörg Bender, Würzburg (DE); Michael Wirachowski, Würzburg (DE); Matthias Kram, Würzburg (DE); Kyrill Siemens, Würzburg (DE); Volker Stampf, Schweinfurt (DE); Reinhold Fischer, Frankenblick (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 67 days.

(21) Appl. No.: 17/609,475

(22) PCT Filed: May 8, 2020

(86) PCT No.: PCT/EP2020/062817
§ 371 (c)(1),
(2) Date: Nov. 8, 2021

(87) PCT Pub. No.: WO2020/225404
PCT Pub. Date: Nov. 12, 2020

(65) Prior Publication Data
US 2022/0186813 A1      Jun. 16, 2022

(30) Foreign Application Priority Data
May 8, 2019   (DE) .......................... 102019206575.9

(51) Int. Cl.
*F16F 15/14* (2006.01)

(52) U.S. Cl.
CPC ...... *F16F 15/145* (2013.01); *F16F 2226/041* (2013.01); *F16F 2226/045* (2013.01); *F16F 2230/0041* (2013.01)

(58) Field of Classification Search
CPC ........... F16F 2226/041; F16F 2226/045; F16F 2230/0041
See application file for complete search history.

(56) References Cited

U.S. PATENT DOCUMENTS

| | | | | |
|---|---|---|---|---|
| 2015/0285332 A1* | 10/2015 | Kram | ..................... | F16F 15/145 74/574.2 |
| 2016/0208887 A1* | 7/2016 | Kram | ..................... | F16F 15/145 |

FOREIGN PATENT DOCUMENTS

| | | | | |
|---|---|---|---|---|
| CN | 108350983 A | * | 7/2018 | .......... F16F 15/1414 |
| DE | 19954279 A1 | | 5/2001 | |

(Continued)

OTHER PUBLICATIONS

International Search Report and Written Opinion for PCT/EP2020/062817 dated Sep. 14, 2020 (16 pages; with English translation).

*Primary Examiner* — Vicky A Johnson
(74) *Attorney, Agent, or Firm* — Kristin L. Murphy

(57) ABSTRACT

A stop assembly for damper masses of a damper system has a stop device and a stop device carrier which holds the stop device. The stop device has at least one shoulder, which is intended to engage in at least one associated receiving portion of the stop device carrier. In at least one support region, the shoulder is oversized relative to the associated receiving portion to facilitate captive engagement in the receiving portion, and, at a distance from the at least one support region, the shoulder is undersized relative to the associated receiving portion to facilitate assembly-simplifying engagement in the receiving portion.

18 Claims, 5 Drawing Sheets

(56) References Cited

FOREIGN PATENT DOCUMENTS

| | | |
|---|---|---|
| DE | 10224874 A1 | 12/2002 |
| DE | 102012214214 A1 | 3/2013 |
| DE | 102012217958 A1 | 4/2014 |
| DE | 102012219737 A1 | 4/2014 |
| DE | 102013222647 A1 | 5/2015 |
| DE | 102014213749 A1 | 1/2016 |
| DE | 102015212737 A1 | 1/2017 |
| DE | 102015225635 A1 | 6/2017 |

* cited by examiner

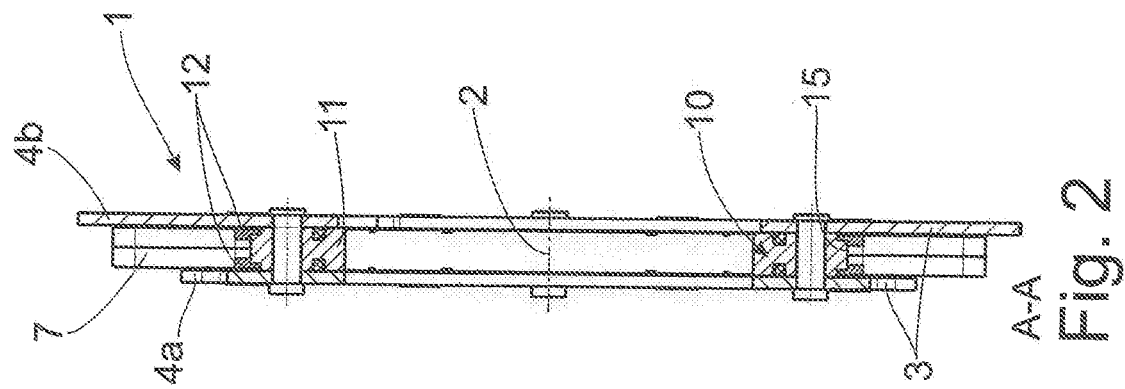
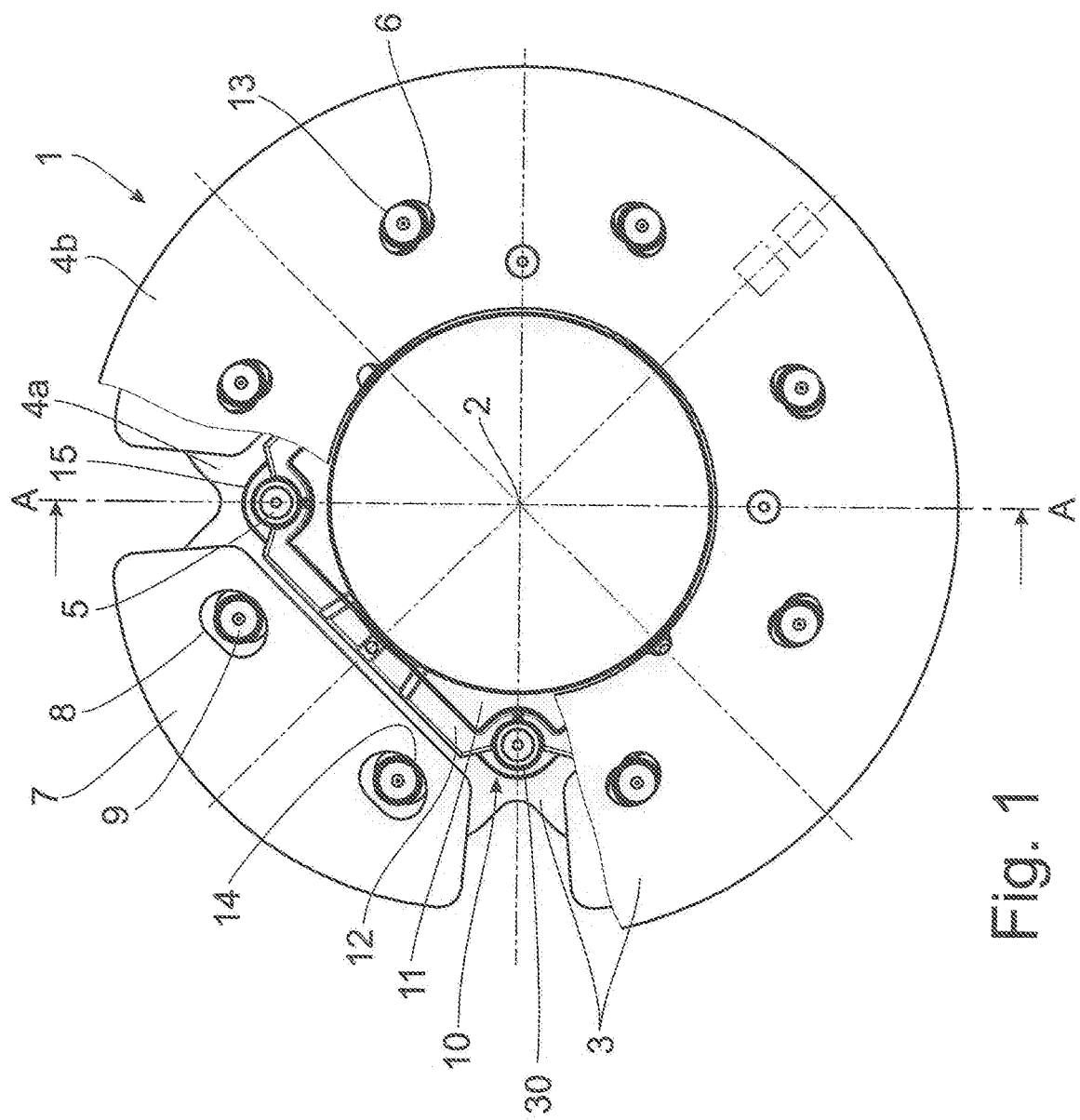

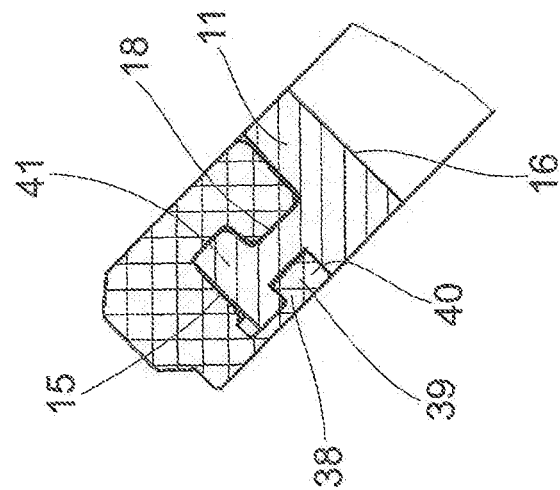
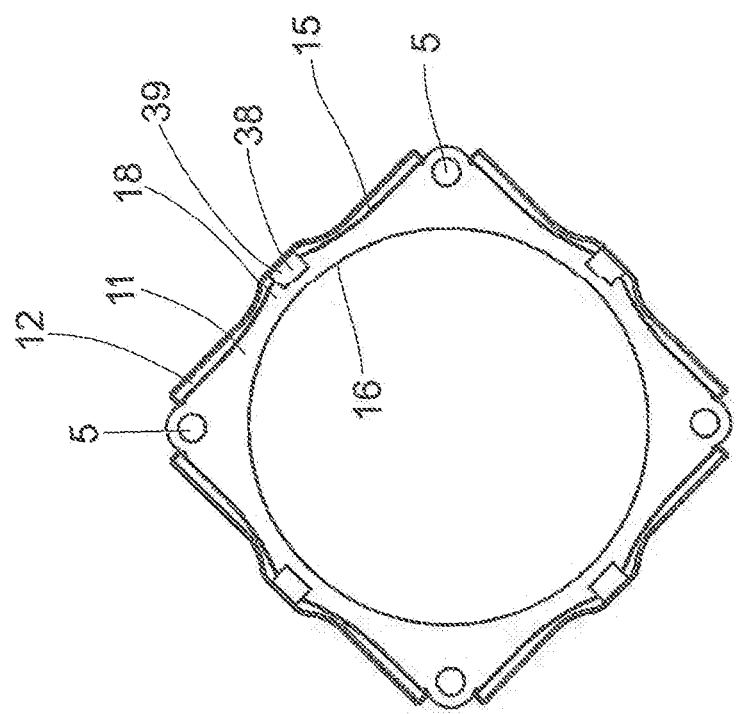
Fig. 9
Fig. 8

STOP ASSEMBLY FOR DAMPER MASSES OF A DAMPER SYSTEM

CROSS-REFERENCE TO RELATED APPLICATIONS

This application is a national stage of International Application No. PCT/EP2020/062817, filed May 8, 2020, the disclosure of which is incorporated herein by reference in its entirety, and which claimed priority to German Patent Application No. 102019206575.9, filed May 8, 2019, the disclosure of which is incorporated herein by reference in its entirety.

TECHNICAL FIELD

The disclosure relates to a stop assembly for damper masses of a damper system, having a stop device and a stop device carrier which holds the stop device.

BACKGROUND

A known stop assembly is disclosed in DE 10 2015 225 635 A1, wherein a stop device carrier serves as a reinforcement for a stop device which is formed from an elastomer. Such a stop assembly, which is formed from two components, is suitable even in the case of damper systems subjected to high loads, such as for example in hybridized drive trains, since the energy of the damper masses is able to be dissipated sufficiently well due to the stop device. The stop assembly is suitable both for limiting the relative deflection width of the damper masses relative to a damper mass carrier in normal operation and for avoiding extreme deflections of the damper masses which may occur both at the start-up of an internal combustion engine arranged upstream of the damper system or when switching off this internal combustion engine, as long as the weight force acting on the damper masses exceeds the rotation-related centrifugal force.

The connection of the stop device to the stop device carrier may be carried out in different ways, namely by adhesive attachment, by an integral design or by a positive connection. While a relatively complicated manufacturing process is required in the two first-mentioned connecting methods for connecting the stop device to the stop device carrier, in the case of a connection by a positive connection, when little play is present between the regions to be brought together by the positive connection, a problem arises of bringing together the two parts in an operative connection in terms of manufacturing technology. When significant play is predetermined between the regions brought together by a positive connection, it is not possible to ensure that the stop device is not inadvertently released again from the stop device carrier during the manufacturing process.

What is needed is to configure a stop assembly such that, during the process of connecting the respective stop device to the associated stop device carrier, the production of an operative connection between the two parts is possible without difficulty in terms of manufacturing technology so that once the connection is produced the parts are secured against being inadvertently released.

SUMMARY

A stop assembly for damper masses of a damper system is provided is provided herein, said stop assembly having a stop device and a stop device carrier which holds the stop device. In one exemplary arrangement, the stop device has at least one shoulder which is intended to engage in at least one associated receiving portion of the stop device carrier, wherein in at least one support region the shoulder is oversized relative to the associated receiving portion to facilitate captive engagement in the receiving portion and, at a distance from the at least one support region, the shoulder is undersized relative to the associated receiving portion to facilitate assembly-simplifying engagement in the receiving portion.

The connection between the stop device to the stop device carrier is thus achieved by the design of the shoulder of the stop device relative to the associated receiving portion of the stop device carrier, namely by the design of the shoulder being oversized on a support region and being undersized on a further support region relative to the receiving portion. While the undersized portion thus introduces sufficient play into the corresponding support region and thereby simplifies the introduction of the shoulder into the corresponding receiving portion, the oversized portion ensures that the shoulder is held in the corresponding receiving portion and thus acts in the sense of a captive securing mechanism for the stop device relative to the stop device carrier, and at least until the production process of the stop assembly is completed. This may be the case, for example, when the stop assembly is to be provided axially between cover elements and these cover elements are fixed relative to one another at a fixed axial distance by spacers. In one exemplary arrangement, such cover elements are provided with guide tracks for receiving coupling elements which also engage in guide tracks of the damper masses and thereby bring about a coupling of the cover elements to the damper masses. Due to their cooperative design with guide tracks, the cover elements are denoted hereinafter as track elements for short.

In one exemplary arrangement, the respective shoulder of the stop device and the corresponding receiving portion of the stop device carrier in each case is provided in a peripheral region of one respective spacer and in each case in a radial region which extends radially between the corresponding spacer and a support region of the stop device carrier running radially internally therefrom. Alternatively or additionally, however, the respective shoulder of the stop device and the corresponding receiving portion of the stop device carrier may also be provided in the peripheral region between two respective spacers and in a radial region of the stop device carrier extending between the radial outer face and the radial inner face of the stop device carrier.

In one exemplary arrangement, both the stop device carrier and the respective stop device in each case may have a centrifugal force-related material recess in the peripheral region of a spacer, on the radial outer face thereof. The reason for this is that the material of the stop device radially outside a spacer is not supported thereby against the action of centrifugal force and, in particular if the stop device includes a very soft elastomer material, it may result in this region being lifted from the spacer by the action of centrifugal force, in particular as the stop device may have a material accumulation specifically in this region. At this point of the stop device the aforementioned problem is effectively remedied by the material recess.

An at least insufficient support for the stop device may also be present in the peripheral region between two spacers. For this reason, in one exemplary arrangement, it may also be advantageous to provide the respective stop device with a centrifugal force-related material recess in this peripheral region. This is also advantageous at this point, in particular, if the stop device includes a very soft elastomer material and thus it may result in this region being lifted from the stop device carrier by the action of centrifugal force.

A particularly stable static connection of the stop device to the stop device carrier is present when the at least one shoulder of the stop device has at least three support regions designed to be oversized relative to the associated receiving portion of the stop device carrier. In one exemplary arrangement, two receiving regions are provided in the peripheral direction on either side of a third receiving region and act in the radial direction on opposing sides of the receiving portion in the manner of this third receiving region. This connection may be produced particularly advantageously when the at least one shoulder of the stop device has the at least one support region in the peripheral direction which is configured to be undersized relative to the associated receiving portion of the stop device carrier, at least substantially in the same region as the at least one support region which is configured to be oversized relative to the associated receiving portion but on the opposing side in the radial direction. The shoulder may then be deflected by the action of force in the direction of the undersized portion such that the undersized portion may be used for introducing the shoulder into the corresponding receiving portion. Once introduced into the receiving portion, this action of force may be terminated so that the shoulder may return into its original position, in which the oversized portion becomes noticeable relative to the receiving portion in a captively securing manner, since an inadvertent release of the shoulder from the corresponding receiving portion is effectively avoided.

In one exemplary arrangement, the stop device carrier has ramps which have a radial slope, starting from axial outer faces of the stop device carrier and extending in a direction toward an axial center of the stop device carrier, and are provided for introducing correspondingly configured shoulders. In one exemplary arrangement, in the axial extension region of the axial outer faces of the stop device carrier, the ramps have in each case a radial flattened portion caused by a tool-related run-out. Due to the radial slope of the ramps, in each case the shoulders are able to be introduced easily from the axial outer faces of the stop device carrier in the direction of the axial center of the stop device carrier, wherein the tool-related run-out in the axial extension region of the axial outer faces leads to a radial narrowing of the receiving portion and thus to an oversized portion which serves as a captive securing arrangement for the shoulders relative to the receiving portion of the stop device carrier and thus to a captive securing arrangement for the stop device during assembly.

A clip connection may also serve as a captive securing arrangement during assembly, said clip connection being effective in each case in the peripheral region between two respective spacers and in each case in a radial region of the stop device carrier extending between the radial outer face and the radial inner face of the stop device carrier.

BRIEF DESCRIPTION OF DRAWINGS

The stop assembly is described hereinafter with reference to the following drawings, in which:

FIG. 1 shows a damper system in plan view with track elements which act as damper mass carriers and which are connected together by spacers, and with a stop assembly which has a stop device carrier and a stop device;

FIG. 2 shows a sectional view along a cutting line A-A in FIG. 1;

FIG. 8 shows a stop assembly with a clip connection between the stop device carrier and the stop device;

FIG. 9 shows an enlarged sectional view of the region of the clip connection.

DETAILED DESCRIPTION

Figure 5:
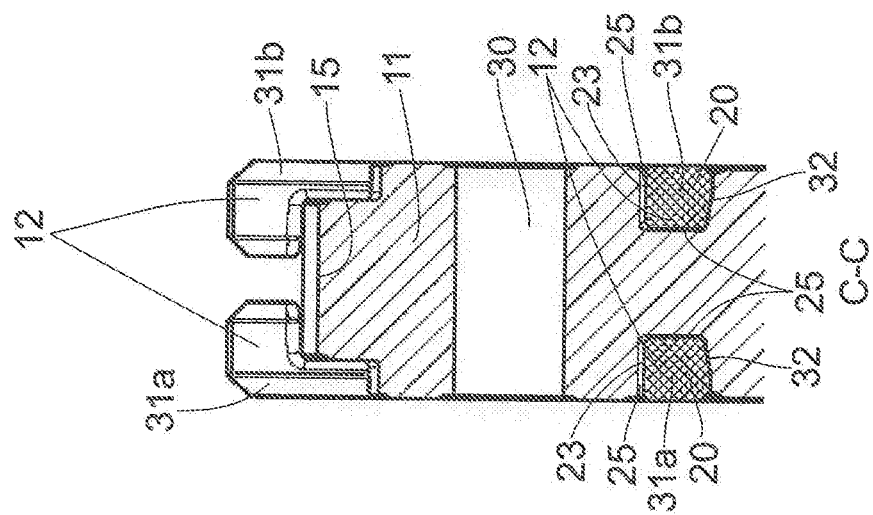
FIG. 5 shows the stop assembly of FIG. 3 along a cutting line C-C.

FIGS. 1 and 2 show a damper system 1 with a central axis 2 and with two track elements 4a, 4b serving as damper mass carriers 3, which are arranged fixedly relative to one another by spacers 5 at a predetermined axial distance. The track elements 4a, 4b have guide tracks 6 with a curvature, an apex thereof 13 being at a maximum distance from the central axis 2. The track elements 4a, 4b receive damper masses 7 axially therebetween, said damper masses 7 having guide tracks 8, wherein these guide tracks 8 have their apex 14 at a minimal distance from the central axis 2. The guide tracks 6 of the track elements 4a, 4b and the guide tracks 8 of the damper masses 7 are connected together by coupling elements 9. In one exemplary arrangement, these coupling elements 9 are rollers which permit, due to their rolling movement in the guide tracks 6, 8, a relative movement of the damper masses 7 relative to the guide tracks 4a, 4b and thus relative to the damper mass carrier 3.

A stop assembly 10 for the damper masses 7 is provided radially inside the damper masses 7. The stop assembly 10 has a stop device carrier 11 and a stop device 12. The stop device carrier 11 has openings 31 (FIGS. 4 and 5) for the passage of the spacers 5 at intervals. In one exemplary arrangement, the intervals are in each case 90°. The openings 31 are thus received by the spacers 5 on the damper mass carrier 3. The radial outer face 15 of the stop device carrier 11, with the exception of the surrounding regions of the spacers 5, is enclosed by the stop device 12 which, as may be seen in FIG. 2, has two stop device parts 31a and 31b in the axial direction. In contrast to the stop device carrier 11 which in one exemplary arrangement, includes a solid material, the stop device 12 is configured as elastomer and thus may also advantageously dampen hard impacts of the damper masses 7.

Figure 4:
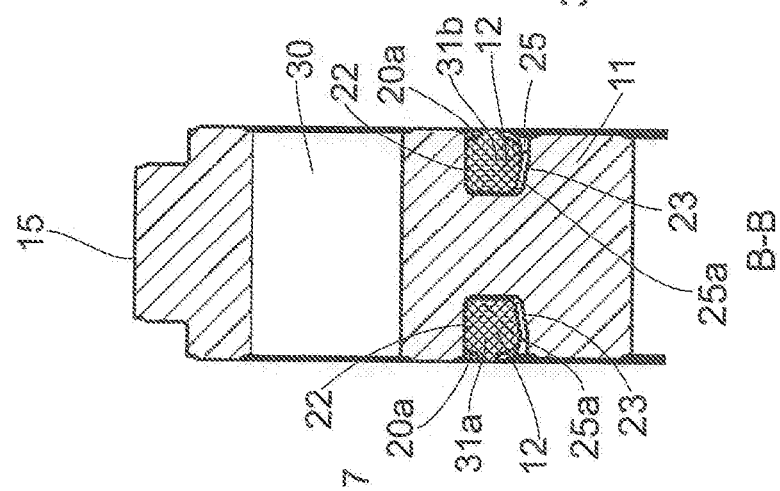
FIG. 4 shows the stop assembly of FIG. 3 along a cutting line B-B.

The fastening of the stop device 12 to the stop device carrier 11 is intended to be described in more detail hereinafter with reference to FIGS. 3 to 5. According to FIG. 3 the stop device 12 is firstly held in each case in the peripheral region U1 of a spacer 5, and secondly in each case in the peripheral region U2 between two respective spacers 5, i.e. for example in the peripheral direction centrally between two respective spacers 5. In the radial direction the stop device 12 is held in the peripheral region U1 of the respective spacer 5 in a first radial region 17 which extends radially between the respective spacer 5 and a support region 19 of the stop device carrier 11 running radially inwardly relative therefrom and in the peripheral region U2 between two respective spacers 5 in a second radial region 18 of the stop device carrier 11 which extends radially between the radial outer face 15 of the stop device carrier 11 and the radial inner face 16 thereof.

Figure 3:
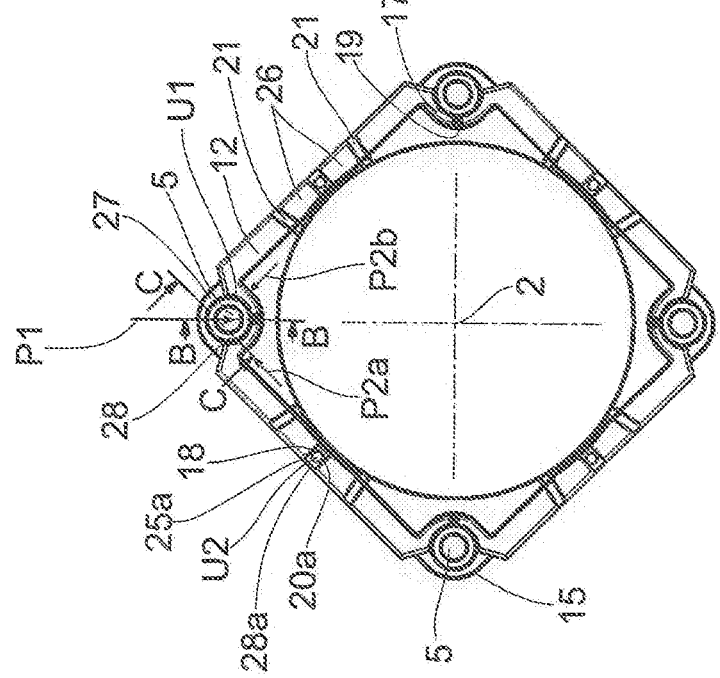
FIG. 3 shows a detailed view of the stop assembly for showing the support of the stop device on the stop device carrier with centrifugal force-related recessed regions.

Contact arrows associated with one of the spacers 5 are illustrated in FIG. 3 and namely a central contact arrow P1 in the peripheral direction which is oriented toward the central axis 2, and two lateral contact arrows P2a and P2b in the peripheral direction on either side of this central contact arrow P1. At the contact points indicated by these contact arrows P1, P2a and P2b the stop device 12, as is intended to be shown in further detail hereinafter, in each case is oversized relative to the stop device carrier 11 and namely as relates to the contact arrow P1 relative to the spacer 5, and as relates to the contact arrows P2a and P2b in each case relative to the support region 19 of the stop device carrier 11.

The stop device 12 is illustrated at the point of the left-hand contact arrow P2a in FIG. 3 by a section C-C in FIG. 5, from which it may be seen that each stop device part 31a or 31b of the stop device 12 axially engages in each case with a shoulder 20 in a receiving portion 25 of the stop device carrier 11, wherein the radial inner faces of the shoulders 20 which are configured to be oversized relative to the receiving portion 25 are highlighted in each case in FIG. 5 by the reference numeral 22. The radial outer faces of the shoulders 20, however, as also illustrated in FIG. 5, are configured to be undersized relative to the receiving portion 25 of the stop device carrier 11, which is highlighted in each case in FIG. 5 by the reference numeral 23. Relating to the stop device 12 at the point of the central contact arrow P1 in FIG. 3, this is highlighted in FIG. 4 by a section B B, from which it may be seen that here the radial outer faces of the shoulders 20 are configured in each case to be oversized 22 relative to the receiving portion 25, and the radial inner faces of the shoulders 20 are configured to be undersized 23 relative to the receiving portions 25 of the stop device carrier 11. In each case a support region 28 is formed by each shoulder 20 engaging in the receiving portion 25.

For the purpose of a simple introduction of the stop device 12 into the stop device carrier 11, use is made of the fact that the radial opposing face of a portion of a stop device part 31a, 31b which is configured to be oversized 22 is always combined with a portion which is configured to be undersized 23. By applying a radial force, which at the points illustrated in FIG. 3 of the contact arrows P1, P2a, and P2b is oriented in each case with these contact arrows P1, P2a and P2b, the stop device 12 may be easily introduced due to the play which is produced by the undersized portion 23 present at this point, by the respective stop device part 31a, 31b of the two-part stop device 12 in each case being displaced sufficiently axially in the direction of the stop device carrier 11 until the shoulders 20 are in each case at least substantially immersed in the corresponding receiving portion 25 of the stop device carrier 11. Once it has entered this position, as soon as it is free of the forces required for the introduction, the stop device 12 is held in a captively secured manner by the stop device carrier 11 due to the oversized portion 22 between the shoulders 20 and the corresponding receiving portions 25.

In addition to the support regions 28 for the stop device 12 in the peripheral regions U1 of the spacers 5, in one exemplary arrangement, the stop device 12 in the peripheral direction U2 may have further support regions 28a between two respective spacers 5, by further shoulders 20a which engage in corresponding receiving portions 25a of the stop device carrier 11 being provided. According the exemplary arrangement shown in FIG. 10, for example, this may be implemented centrally between two respective spacers 5. On these support regions 28a the shoulders 20a are also configured in each case to be oversized 22 on a radial face and to be undersized 23 on the radial face opposing thereto relative to the corresponding receiving portion 25a, so that both the introduction of the stop element parts 31a, 31b of the stop device 12 into the stop device carrier 11 and the function of captive securing are produced, as has been described above with reference to the support regions 28. The shoulders 20a of the stop element parts 31a, 31b and the receiving portions 25a of the stop device carrier 11 are provided in each case in the second radial region 18 of the stop device carrier 11 extending between the radial outer face and the radial inner face of the stop device carrier 11.

By supplementing the support regions 28a in the peripheral direction between two respective support regions 28, the stop device 12 also obtains an effective radial support against centrifugal forces between two respective spacers 5. The peripheral regions 26 of the stop device 12 which extend in the peripheral direction between the support regions 28 and 28a are subjected to less centrifugal force and do not have connections between the stop device carrier 11 and the stop device 12 in the sense of the aforementioned support regions 28 or 28a.

Figure 10:
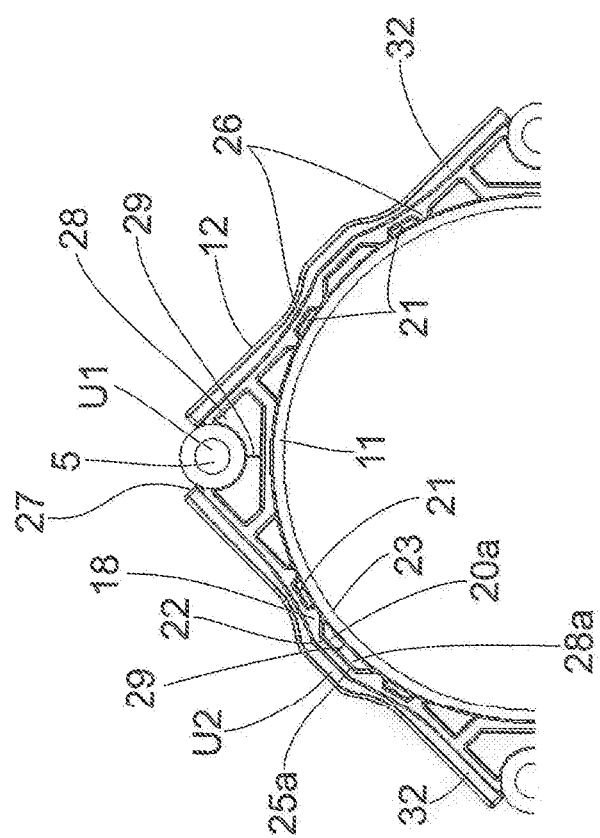
FIG. 10 shows a stop assembly with a view of suitable points for a joint line of the stop device.

For improved adaptation of these peripheral regions 26 to the unavoidable centrifugal forces, in one exemplary arrangement, material recesses 21 are provided according to FIG. 3 or FIG. 10. Due to the resulting smaller mass, these peripheral regions 26 may be better supported by the adjacent support regions 28 or 28a. In one exemplary arrangement, regions of the stop device 12 which otherwise would be located radially outside the respective spacer 5, and thus could not be supported thereby against centrifugal forces, are also configured with material recesses 27. Due to the material recesses 27, a situation is avoided that regions of the stop device 12 are able to be detached by centrifugal force from the spacers 5 and thereby from the support regions 28.

Figure 6:
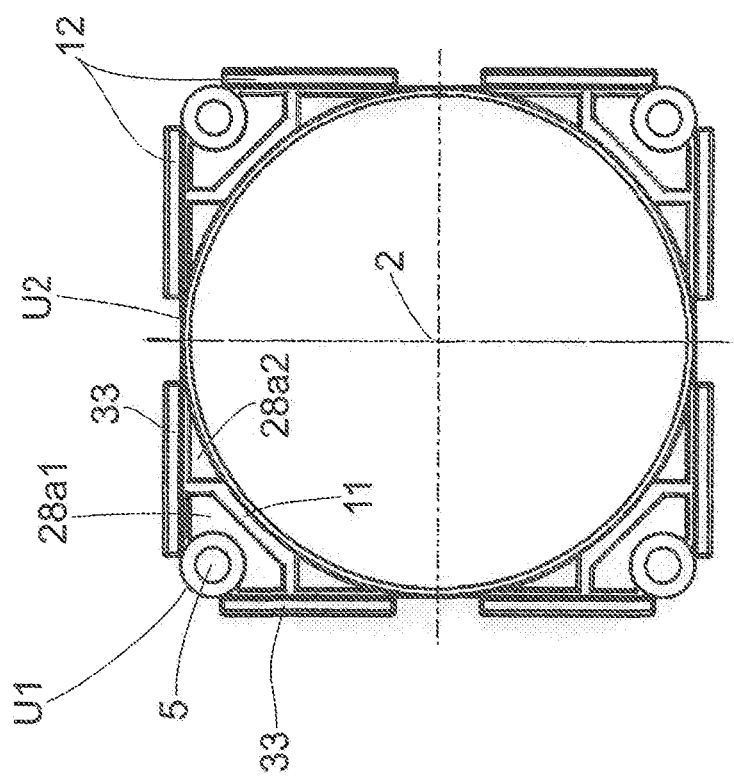
FIG. 6 shows as in FIG. 3 but with further centrifugal force-related recessed regions.

Allowing for material recesses 21 or 27 is implemented in the exemplary arrangement according to FIG. 6. Instead of stop devices 12 which enclose the corresponding stop device carrier 11 as in FIG. 3 in an approximately annular manner, or stop devices 12 which form the respective stop device carrier 11 as in FIG. 10 by stop strips 32 running in each case between two spacers 5, the stop device 12 according to FIG. 6 has only stop strip segments 33 which, starting from the respective peripheral region U1, extend at least substantially dose to the respective peripheral region U2 and thus have relatively large material recesses 21 or 27. In one exemplary arrangement, the stop strip segments 33 are supported in support regions 28a1, 28a2 relative to the stop device carrier 11.

Returning to the support regions 28, 28a shown in FIG. 10, these may be used for a further positive effect. Possible joint lines 29 of the stop device 12, which are produced during the production of the stop device 12 by injecting elastomer material into a tool carrier, are accommodated at these points. Expansion forces acting in the support regions 28, 28a are minimized, whereby a predetermined breaking point is avoided.

Figure 7:
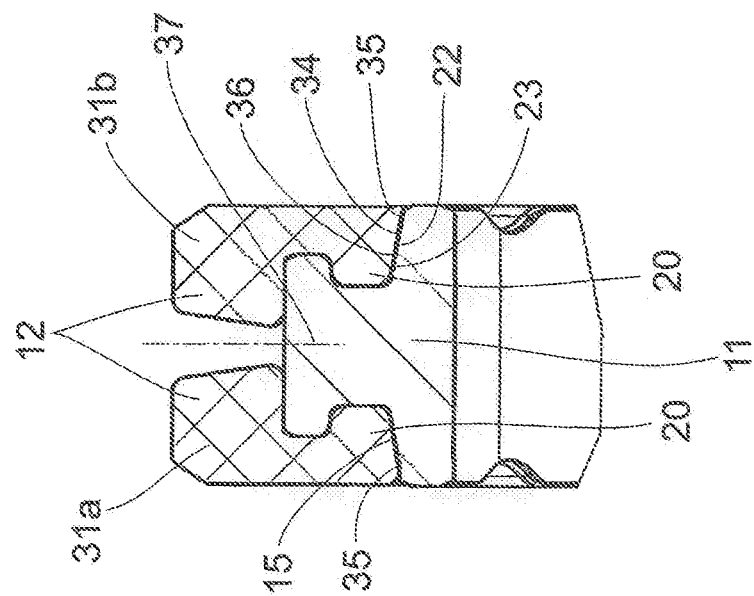
FIG. 7 shows as in FIG. 5 but with at least approximately conical contours on the stop device carrier and on the stop device.

If the stop device carrier 11 is provided on its radial outer face 15 with ramps 34 running at least substantially conically in the axial direction, as shown in FIG. 7, in one exemplary arrangement, the radial inner faces 36 of the stop device parts 31a and 31b are also configured running at least substantially conically in the axial direction. The axial outer portion of the ramps 34, caused by a tool-related run-out, may have a radial flattened portion 35 relative to the part of the ramps 34 running toward the component center 36. As a result, an oversized portion 22 is produced on the stop device 12 in the region of the radial flattened portion 35, even if this stop device is configured to be undersized 23, which, however, may have an effect only axially on the other side of the radial flattened portion 35.

According to the exemplary arrangement shown in FIG. 8 in each case a clip connection 39, which acts between the stop device 12 and the stop device carrier 11 and which serves during assembly as a captive securing arrangement 38 for the stop device 12 relative to the stop device carrier 11, may be provided in the peripheral region between two spacers 5 and in each case in a radial region 18 of the stop device carrier 11 extending between the radial outer face 15 and the radial inner face 16 of the stop device carrier 11. As shown in detail in FIG. 9, for forming this dip connection 39, the stop device 12 has an axially resilient lip 40 which acts radially inwardly and which is axially deflected when pushed over a radial outer web 41 of the stop device carrier 11, in order to engage radially behind this web 41 when the process of pushing over is completed, by springing back into its axial initial position.

The invention claimed is:

1. A stop assembly for damper masses of a damper system, comprising, a stop device and a stop device carrier which holds the stop device, wherein the stop device has at least one shoulder which is configured to engage in at least one associated receiving portion of the stop device carrier, wherein in at least one support region the shoulder is oversized relative to the associated receiving portion to facilitate captive engagement in the receiving portion and, at a distance from the at least one support region, the shoulder is undersized relative to the associated receiving portion to facilitate an assembly-simplifying engagement in the receiving portion; and wherein both the stop device carrier and the respective stop device in each case have a centrifugal force-related material recess in a peripheral region of a spacer, on a radial outer face thereof.

2. The stop assembly as claimed in claim 1, wherein the at least one shoulder of the stop device has at least three support regions designed to be oversized relative to the associated receiving portion of the stop device carrier, wherein two of the three support regions are provided in a peripheral direction on either side of a third support region of the three support regions and act in a radial direction on opposing sides of the receiving portion in the manner of the third receiving region.

3. The stop assembly as claimed in claim 1, wherein the at least one shoulder of the stop device has the at least one support region in a peripheral direction which is configured to be undersized relative to the associated receiving portion- of the stop device carrier, at least substantially in the same region as the at least one support region which is configured to be oversized relative to the associated receiving portion but on an opposing side in a radial direction.

4. The stop assembly as claimed in claim 3, wherein the at least one shoulder of the stop device is selectively deflectable by a force acting in a direction of its undersized portion relative to the receiving portion of the stop device carrier for introducing the shoulder into the corresponding receiving portion.

5. The stop assembly as claimed in claim 1, wherein the stop device carrier has ramps which have a radial slope, starting from axial outer faces of the stop device carrier and extending in the direction of the axial component center, and which are provided for the receiving portions of shoulders.

6. The stop assembly as claimed in claim 5, wherein the ramps in an axial extension region of the axial outer faces of the stop device carrier have in each case a radial flattened portion caused by a tool-related run-out, which in cooperation with the corresponding shoulder forms the oversized portion which acts in a captively securing manner for the shoulder of the stop device relative to the receiving portion of the stop device carrier during assembly.

7. A stop assembly for damper masses of a damper system, comprising,
a stop device and a stop device carrier which holds the stop device,
wherein the stop device has at least three support regions and at least one shoulder which is configured to engage in at least one associated receiving portion of the stop device carrier, and
wherein the at least three support regions are designed to be oversized relative to the associated receiving portion of the stop device carrier to facilitate captive engagement in the receiving portion and, at a distance from the at least one support region, wherein two of the three support regions are provided in a peripheral direction on either side of a third support regarding of the three support regions, and
wherein the shoulder is undersized relative to the associated receiving portion to facilitate an assembly-simplifying engagement in the receiving portion.

8. The stop assembly as claimed in claim 7, wherein the stop device carrier-has ramps which have a radial slope, starting from axial outer faces of the stop device carrier and extending in a direction of an axial component center, and which are provided for the receiving portions of shoulders.

9. The stop assembly as claimed in claim 8, wherein the ramps in an axial extension region of the axial outer faces of the stop device carrier have in each case a radial flattened portion caused by a tool-related run-out, which in cooperation with the corresponding shoulder forms an oversized portion which acts in a captively securing manner for the shoulder of the stop device relative to the receiving portion of the stop device carrier during assembly.

10. The stop assembly as claimed in claim 9, further comprising a first track element and a second track element arranged on either side of the stop device carrier and the stop device, wherein the track elements are held by spacers in a predetermined relative position to one another, wherein the respective shoulder of the stop device and the corresponding receiving portion of the stop device carrier are provided in each case in a peripheral region of one respective spacer.

11. The stop assembly as claimed in claim 10, wherein the first and second track elements in a first radial region extend radially between the corresponding spacer and a support region of the stop device carrier running radially inwardly therefrom.

12. A damper system, comprising:
a first track element and a second track element arranged fixedly relative to one another by spacers at a predetermined axial distance;
wherein the track elements receive damper masses axially therebetween; and
a stop assembly for the damper masses, comprising
a stop device and a stop device carrier that holds the stop device,
wherein the stop device has at least one shoulder which is configured to engage at least one associated receiving portion of the stop device carrier, wherein in at least one support region the shoulder is oversized relative to the associated receiving portion to facilitate captive engagement in the receiving portion and, at a distance from the at least one support region, the shoulder is undersized relative to the associated receiving portion to facilitate an assembly-simplifying engagement in the receiving portion;

wherein the first and second track elements are arranged on either side of the stop device carrier and the stop device.

13. The damper system of claim 12, wherein the damper masses further comprise guide tracks, and wherein the respective shoulder of the stop device and the corresponding receiving portion of the stop device carrier are provided in each case in a peripheral region of one respective spacer.

14. The damper system as claimed in claim 12, wherein the respective stop device in each case has a centrifugal force-related material recess in the peripheral region between two spacers.

15. The damper system as claimed in claim 12, wherein the respective shoulder of the stop device and the corresponding receiving portion of the stop device carrier are provided in each case in a first radial region which extends radially between the corresponding spacer and a support region of the stop device carrier running radially inwardly therefrom.

16. The damper system as claimed in claim 12, wherein the shoulder of the stop device and the corresponding receiving portion of the stop device carrier are provided in a second peripheral region in the peripheral direction between two respective spacers and in a second radial region of the stop device carrier extending between a radial outer face and a radial inner face of the stop device carrier.

17. A stop assembly for damper masses of a damper system, comprising, a stop device and a stop device carrier which holds the stop device, wherein the stop device has at least one shoulder which is configured to engage in at least one associated receiving portion of the stop device carrier, wherein in at least one support region the shoulder is oversized relative to the associated receiving portion to facilitate captive engagement in the receiving portion and, at a distance from the at least one support region, the shoulder is undersized relative to the associated receiving portion to facilitate an assembly-simplifying engagement in the receiving portion; and further comprising a first track element and a second track element arranged fixedly relative to one another by spacers at a predetermined axial distance, with the stop device carrier therebetween, and a clip connection, which is effective between the stop device and the stop device carrier and acts in a captively securing manner for the stop device relative to the stop device carrier during assembly, wherein the clip connection is provided in a peripheral region between two respective spacers and in each case in a radial region of the stop device carrier extending between a radial outer face and the radial inner face of the stop device carrier.

18. The stop assembly as claimed in claim 17, wherein the first and second track elements in a first radial region extends radially between the corresponding spacer and a support region of the stop device carrier running inwardly therefrom.

* * * * *